United States Patent
Obara

(10) Patent No.: US 6,599,020 B2
(45) Date of Patent: *Jul. 29, 2003

(54) DOUBLE SEAL BEARING

(75) Inventor: Rikuro Obara, Nagano (JP)

(73) Assignee: Minebea Kabushiki-Kaisha, Nagano-Ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/006,156

(22) Filed: Dec. 10, 2001

(65) Prior Publication Data

US 2002/0041720 A1 Apr. 11, 2002

Related U.S. Application Data

(62) Division of application No. 09/116,658, filed on Jul. 17, 1998.

(30) Foreign Application Priority Data

Jul. 31, 1997 (JP) ................................................ 9-220631

(51) Int. Cl.[7] ................................................ F16C 33/76
(52) U.S. Cl. ...................................... 384/480; 384/477
(58) Field of Search ................................ 384/480, 477, 384/488, 484, 485, 486

(56) References Cited

U.S. PATENT DOCUMENTS

| | | | |
|---|---|---|---|
| 2,152,444 A | 3/1939 | Searles | 384/480 |
| 2,385,306 A | 9/1945 | Shafer | 384/477 |
| 2,419,885 A | 4/1947 | Cooper | 384/477 X |
| 3,396,977 A | 8/1968 | Iguchi | 384/477 X |
| 3,550,974 A | 12/1970 | Kupchick | 384/480 |
| 4,371,176 A | 2/1983 | Shimano | 384/480 |
| 4,379,600 A | 4/1983 | Muller | 384/480 |
| 4,452,497 A | 6/1984 | Zillhardt | 384/480 |
| 4,808,012 A | 2/1989 | Otto | 384/484 X |
| 4,978,236 A | 12/1990 | Ostling | 384/480 |
| 5,002,406 A | 3/1991 | Morton et al. | 384/477 |
| 5,028,054 A | 7/1991 | Peach | 384/480 X |
| 5,435,654 A | 7/1995 | Ishida et al. | 384/488 |
| 5,560,715 A | 10/1996 | Mosby | 384/477 |
| 6,068,407 A | 5/2000 | Kobayashi et al. | 384/488 |

FOREIGN PATENT DOCUMENTS

FR   569 065   4/1924

Primary Examiner—David A. Bucci
Assistant Examiner—Colby Hansen
(74) Attorney, Agent, or Firm—Israel Gopstein

(57) ABSTRACT

A double seal bearing includes a labyrinth seal mechanism. The double seal bearing is provided with a pair of annular inner and outer sealing plates having respective central openings with a remaining slight clearance between each respective sealing plate and one of the inner and outer races, respectively, so as to assure the labyrinth seal function.

7 Claims, 6 Drawing Sheets

DOUBLE SEAL BEARING

This application is a Divisional of application Ser. No. 09/116,658 filed Jul. 17, 1998.

BACKGROUND OF THE INVENTION

1. Technical Field

The present invention relates in particular to a double seal bearing including a pair of sealing plates of a non-contacting type on at least one side thereof, and more particularly to a double seal ball bearing especially suitable for a spindle motor of a hard disk drive.

2. Description of the Prior Art

The bearing illustrated in FIG. 11 includes a non-contacting type of sealing structure of the prior art.

This non-contacting type of sealing structure of the prior art includes at least on one end thereof a sealing plate 11. This sealing structure is of the non-contacting type in which the outer peripheral edge of the sealing plate 11 is secured on the end surface of the outer race 2, whereas the inner peripheral edge of this sealing plate is separated from the outer peripheral surface of the inner race 1.

A disadvantage inherent in the non-contacting type of bearing is that the grease contained within the bearing and dust or other contaminant produced within the bearing tend to flow out through the clearance formed at the non contacting portion of the bearing while the inner or outer race is rotated.

In general, the following countermeasures have been taken to eliminate the above mentioned disadvantage.

(1) One of the countermeasures is to make the inner peripheral edge 12a of the sealing plate contact with the outer peripheral surface of the inner race 1 as shown in FIG. 12.
(2) The other of the countermeasures is to provide an oil seal (the seal of contacting type) or a labyrinth seal mechanism of non-contacting type for avoiding the flowing out of the grease or dusts.

However, the following problems or disadvantages are present in these countermeasures.

(1) As for the bearing including a sealing structure of the contacting type in which the inner peripheral edge of the sealing plate contacts with the inner race, there are the problems listed below:

(a) a torque is generated due to the friction between elements;
(b) wear is produced on the contacting portion (especially on the inner peripheral edge of the sealing plate) during the utilization of the bearing. This leads to the leakage of the grease and the production of the dusts or particles due to wear; and
(c) the material which can be employed for the sealing plate is limited to rubber materials or resinous materials. This leads to limitations on applications for the bearing.

(2) As for the bearing including a sealing structure such as the oil seal (the seal of contacting type), or the bearing including a sealing structure of the non-contacting type such as the labyrinth seal mechanism, there is a substantial common problem that additional space is required for providing such sealing means. This is an essential problem for the equipment necessitating the miniaturization thereof. In addition, the cost for manufacturing the bearing is also increased.

In the case of the bearing adapted to be used in the spindle motor of the hard disk drive means, the function of the magnetic disk is affected seriously, if wear particles produced during rotation flow into the magnetic disk portion.

In recent years, various sealing means are proposed for preventing the particles produced within the bearing from flowing out of the bearing.

In these sealing means, although it is necessary to provide a sealing effect similar to that had been obtained by the bearing including a sealing means of contacting type, such bearing can not be adopted since it produces wear particles at the sealing contacting portion between elements.

In this connection, following structures for sealing have been adopted:

the structure in which a bearing including a sealing plate of non-contacting type at the one side thereof is used together with an additional labyrinth mechanism;

the structure in which a bearing including a sealing plate of non-contacting type at the one side thereof is used together with an additional magnetic fluid sealing mechanism; and the structure in which a bearing including a sealing plate of non-contacting type at the one side thereof is used together with an additional magnetic fluid sealing mechanism and a labyrinth mechanism.

In these structures, additional space is required for installing such additional sealing mechanisms as mentioned above.

Additionally, the distance between bearings (bearing span) is insufficient for eliminating the harmonic vibration due to the lack of the accuracy of the rotation of the motor hub and the rigidity of assembly. The stability of the rotation is not assured. Further, it is difficult to substantially prevent the particles within the bearing from flowing out into the disk portion.

Accordingly, the object of the present invention is to improve and ascertain the non-contacting sealing function by providing dual labyrinth mechanism through incorporating an additional labyrinth mechanism into the bearing of prior non-contacting type including at the one side thereof a sealing plate.

Another object of the present invention is to provide a multi purpose bearing which can be employed not only as a bearing of inner race rotating type, but also as a bearing of outer race rotating type.

SUMMARY OF THE INVENTION

In order to achieve these and other objects, the basic structure of the bearing of the present invention includes an inner race, an outer race, and rotating bodies interposed therebetween. The bearing is provided with at least one side thereof a pair of annular inner and outer sealing plates having a central opening respectively so as to remain a slight clearance between each plate and one of the inner and outer races respectively to assure the labyrinth seal function.

Each side portion of the inner race is provided with a stepped contour including an inner shoulder of smaller diameter and an outer shoulder of larger diameter. Each side portion of the outer race is also provided with a stepped contour including an inner shoulder of smaller diameter and an outer shoulder of larger diameter. Each side portion of the bearing is adapted to be closed by a pair of annular sealing plates. Each of these plates is provided with a central opening respectively. The embodiments of the bearing of the present invention will now be described as follows.

<The First Embodiment of the Invention>

The outer peripheral portion of the inner sealing plate is secured on an inner shoulder of the outer race with leaving a slight clearance between the inner peripheral surface of the sealing plate and an inner shoulder of the inner race. Thus, the sealing plate and the inner race are prevented from contacting with each other, and a labyrinth seal function can be obtained. The inner peripheral portion of the outer sealing plate is secured by any adhesive on the outer shoulder of the inner race with leaving a slight clearance between the outer peripheral surface of the sealing plate and the outer shoulder of the outer race so as to prevent the sealing plate and the outer race from contacting with each other. Thus the labyrinth seal function can be obtained.

<The Second Embodiment of the Invention>

The inner peripheral portion of the inner sealing plate is secured by any adhesive on the inner shoulder of the inner race with leaving a slight clearance between the outer peripheral surface of the sealing plate and the inner shoulder of the outer race so as to prevent the sealing plate and the outer race from contacting with each other. Thus the labyrinth seal function can be obtained. The outer peripheral portion of the outer sealing plate is secured by any adhesive on the outer shoulder of the outer race with leaving a slight clearance between the inner peripheral surface of the sealing plate and the outer shoulder of the inner race so as to prevent the sealing plate and the inner race from contacting with each other. Thus the labyrinth seal function can be obtained.

<The Third Embodiment of the Invention>

The outer peripheral portion of the inner sealing plate is secured by any adhesive on the inner shoulder of the outer race with leaving a slight clearance between the inner peripheral surface of the sealing plate and the inner shoulder of the inner race so as to prevent the sealing plate and the inner race from contacting with each other. Thus the labyrinth seal function can be obtained. The outer peripheral portion of the outer sealing plate is also secured by any adhesive on the outer shoulder of the outer race with leaving a slight clearance between the inner peripheral surface of the sealing plate and the outer shoulder of the inner race so as to prevent the sealing plate and the inner race from contacting with each other. Thus the labyrinth seal function can be obtained.

<The Fourth Embodiment of the Invention>

The inner peripheral portion of the inner sealing plate is secured by any adhesive on the inner shoulder of the inner race with leaving a slight clearance between the outer peripheral surface of the sealing plate and the outer shoulder of the inner race so as to prevent the sealing plate and the outer race from contacting with each other. Thus the labyrinth seal function can be obtained. The inner peripheral portion of the outer sealing plate is also secured by any adhesive on the outer shoulder of the inner race with leaving a slight clearance between the outer peripheral surface of the sealing plate and the outer shoulder of the outer race so as to prevent the sealing plate and the outer race from contacting with each other. Thus the labyrinth seal function can be obtained.

<The Fifth Embodiment of the Invention>

The inner race of this embodiment includes only one shoulder, and the inner peripheral portion of the inner sealing plate is secured thereon by any adhesive with leaving a slight clearance between the outer peripheral surface of the sealing plate and the inner shoulder of the outer race so as to prevent the sealing plate and the outer race from contacting with each other. Thus the labyrinth seal function can be obtained. The diameter of the inner peripheral portion of the outer sealing plate is same as or larger than the diameter of the shaft bearing bore of the inner race. The outer peripheral portion of the outer sealing plate is secured by any adhesive on the outer shoulder with leaving a slight axial clearance between the end surface of the inner race and the surface of the outer sealing plate opposing thereto so as to prevent the sealing plate and the inner race from contacting with each other. Thus the labyrinth seal function can be obtained.

<The Sixth Embodiment of the Invention>

The outer peripheral portion of the inner sealing plate is secured by any adhesive on the inner shoulder of the outer race with leaving a slight clearance between the inner peripheral surface of the sealing plate and the shoulder of the inner race so as to prevent the sealing plate and the inner race from contacting with each other. Thus the labyrinth seal function can be obtained therebetween. The diameter of the inner peripheral portion of the outer sealing plate is same as or larger than the diameter of the shaft bearing bore of the inner race. The outer peripheral portion of the outer sealing plate is secured by any adhesive on the outer shoulder with leaving a slight axial clearance between the end surface of the inner race and the surface of the outer sealing plate opposing thereto so as to prevent the sealing plate and the inner race from contacting with each other. Thus the labyrinth seal function can be obtained.

<The Seventh Embodiment of the Invention>

The outer race includes only one shoulder, and the outer peripheral portion of the inner sealing plate is secured thereon by any adhesive with leaving a slight clearance between the inner peripheral surface of the sealing plate and the inner shoulder of the inner race so as to prevent the sealing plate and the inner race from contacting with each other. Thus the labyrinth seal function can be obtained. The diameter of the outer peripheral portion of the outer sealing plate is same as or smaller than that of the outer race. The inner peripheral portion of the outer sealing plate is secured by any adhesive on the outer shoulder with leaving a slight axial clearance between the end surface of the outer race and the surface of the outer sealing plate opposing thereto so as to prevent the sealing plate and the outer race from contacting with each other. Thus the labyrinth seal function can be obtained.

<The Eighth Embodiment of the Invention>

The outer race includes only one shoulder, and the outer diameter of the outer sealing plate is same as or slightly smaller than that of outer race. The inner peripheral portion of the inner sealing plate is secured on the inner shoulder of inner race by any adhesive with leaving a slight clearance between the outer peripheral surface of the sealing plate and the shoulder of the outer race so as to prevent the sealing plate and the outer race from contacting with each other. Thus the labyrinth seal function can be obtained. The inner peripheral portion of the outer sealing plate is secured by any adhesive on the outer shoulder of inner race with leaving a slight axial clearance between the end surface of the outer race and the surface of the outer sealing plate opposite thereto so as to prevent the sealing plate and the outer race from contacting with each other. Thus the labyrinth seal function can be obtained.

The advantages of the present invention

The following advantages can be obtained by a pair of sealing plates of non-contacting type incorporated into the end portion or portions of the bearing per se.

(a) The sealing effect will be increased substantially relative to the bearing of the prior art including one sealing plate of the non-contacting type.

(b) The leakage of the grease contained in the bearing through the non-contacting portion of the sealing plate can be avoided, and the performance on the rotation of the bearing can be improved.

(c) The conventionally required space for installing the labyrinth seal additionally to the bearing no longer necessary.

(d) It is possible to make the equipment employing the bearing of the present invention compact, to reduce the space required for installing the bearing, and to decrease the cost for making the equipment.

(e) It is possible to substitute the bearing of the present invention for the bearing of the prior art of contacting type, for the purpose of increasing the reliability.

(f) In the case that the double seal bearing of the present invention is incorporated into the motor of the hard disk drive means, particles within the bearing are prevented from flowing into the magnetic disk by means of the labyrinth seal function of the bearing. In this connection, it is not necessary to provide additional labyrinth seal and/or magnetic fluid seal. Further, it is also possible to increase the bearing span. In conclusion, the disadvantages or problems associated with the bearing of the prior art can be eliminated once and for all by the present invention.

BRIEF DESCRIPTION OF THE DRAWINGS

Further feature of the present invention will become apparent to those skilled in the art to which the present invention relates from reading the following specification with reference to the accompanying drawings, in which.

DETAILED DESCRIPTION OF THE PRESENT INVENTION

Figure 1:
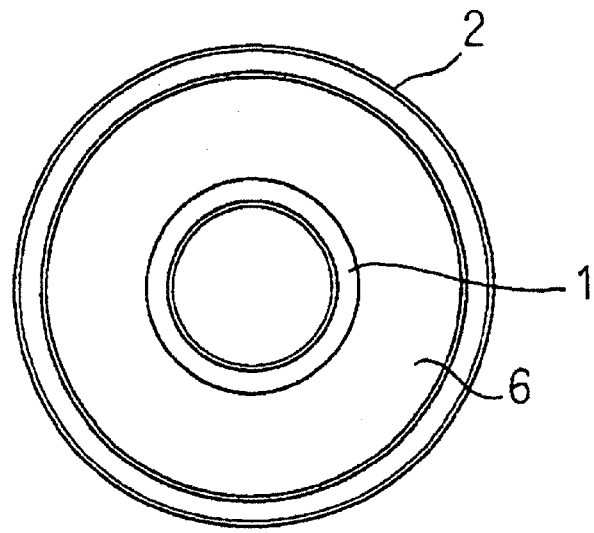
FIG. 1 is an elevational view showing a double seal bearing of the first embodiment of the present invention.

The first embodiment of the bearing of the present invention will now be described with reference to FIGS. 1 and 2.

Figure 10:
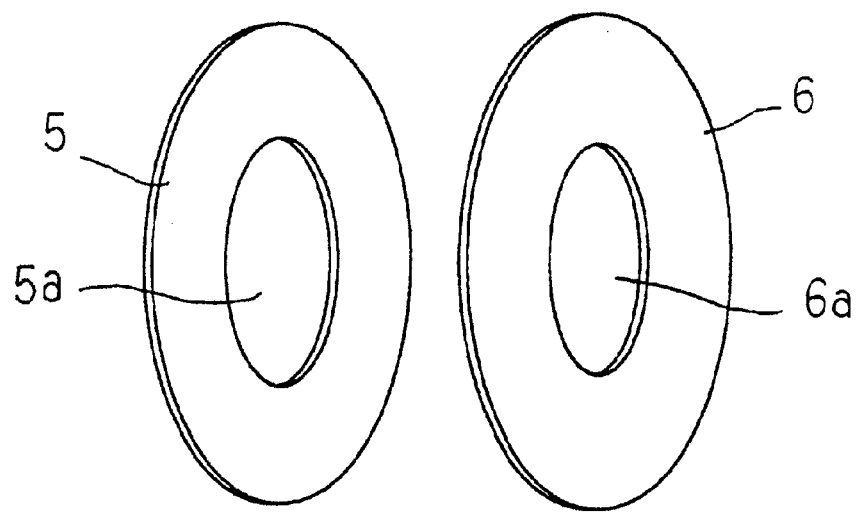
FIG. 10 is a perspective view showing annular sealing plates adapted to be incorporated into the double seal bearing of the present invention.
Figure 11:
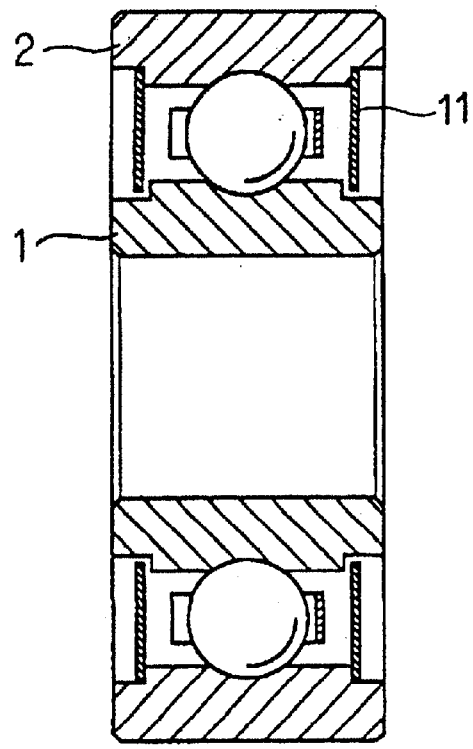
FIG. 11 is a longitudinal cross sectional view showing the bearing of non-contacting type of the prior art.
Figure 12:
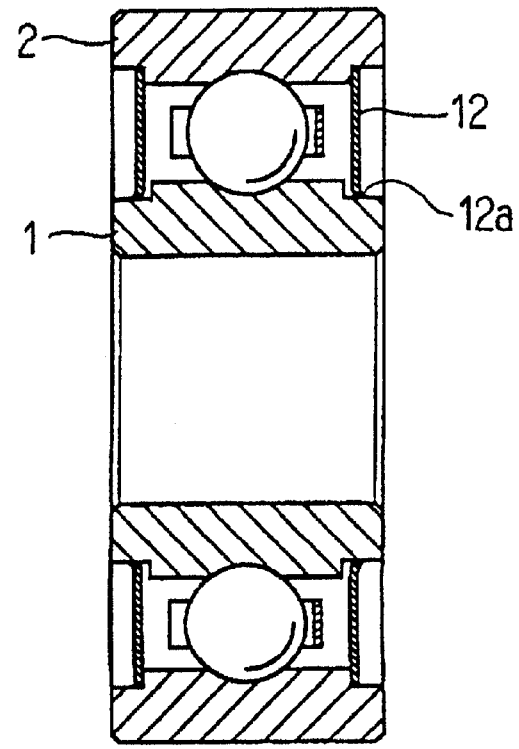
FIG. 12 is a longitudinal cross sectional view showing the bearing of contacting type of the prior art.

In the structure of the bearing as shown in these figures, the bearing includes an inner race 1, an outer race 2, and a rotating body such as balls 3 retained between inner and outer races by means of retainer 4. Each side portion of the inner race 1 is provided with stepped contour including an inner shoulder 1a of smaller diameter and an outer shoulder 1b of larger diameter. Each side portion of the outer race 2 is also provided with stepped contour including an inner shoulder 2a of smaller diameter and an outer shoulder 2b of larger diameter. Each side portion of the bearing is adapted to be closed by a pair of annular sealing plates 5 and 6 such as those shown in FIG. 10. Each of these plates 5 and 6 is provided with a central opening 5a, 6a respectively.

Figure 2:
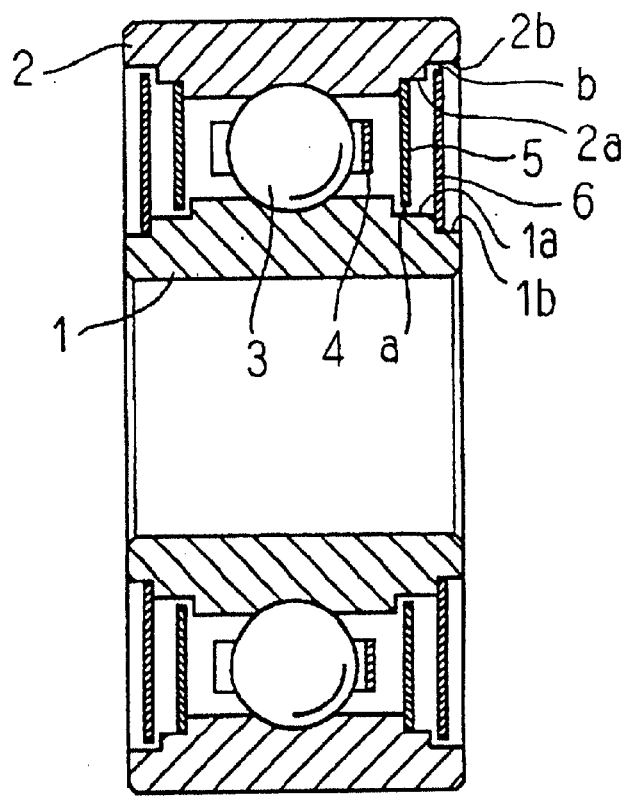
FIG. 2 is a longitudinal cross sectional view showing the double seal bearing as shown in FIG. 1.

In the first embodiment of the present invention as shown in FIG. 2, the outer peripheral portion of the inner sealing plate 5 is secured by any adhesive on the inner shoulder 2a of the outer race 2 with leaving a slight clearance (a) between the inner peripheral surface of the sealing plate 5 and the inner shoulder 1a of the inner race 1. Thus, the sealing plate and the inner race are prevented from contacting with each other, and a labyrinth seal function can be obtained.

The inner peripheral portion of the outer sealing plate 6 is secured by any adhesive on the outer shoulder 1b of the inner race 1 with leaving a slight clearance (b) between the outer peripheral surface of the sealing plate 6 and the outer shoulder 2b of the outer race 2 so as to prevent the sealing plate and the outer race from contacting with each other. Thus the labyrinth seal function can be obtained.

Figure 3:
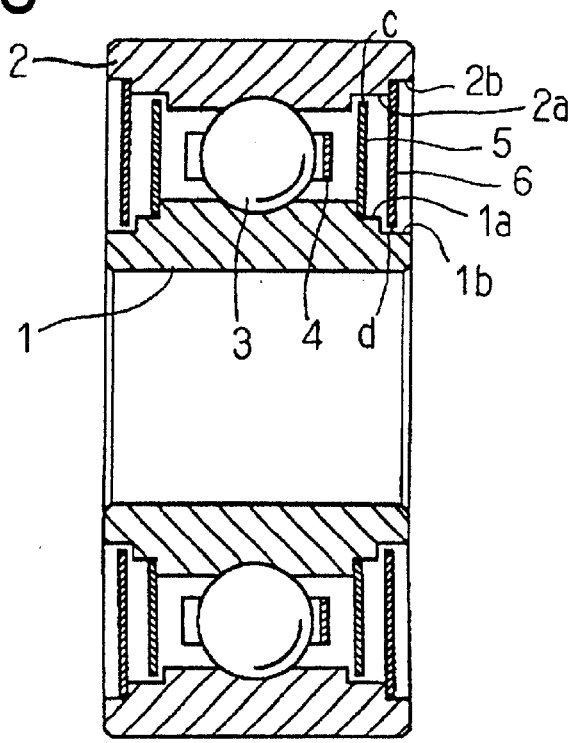
FIG. 3 is a longitudinal cross sectional view showing a double seal bearing of the second embodiment of the present invention.

In the structure of the bearing of the second embodiment of the present invention as shown in FIG. 3, the inner peripheral portion of the inner sealing plate 5 is secured by any adhesive on the inner shoulder 1a of the inner race 1 with leaving a slight clearance (c) between the outer peripheral surface of the sealing plate 6 and the inner shoulder 2a of the outer race 2 so as to prevent the sealing plate and the outer race from contacting with each other. Thus the labyrinth seal function can be obtained. The outer peripheral portion of the outer sealing plate 6 is secured by any adhesive on the outer shoulder 2b of the outer race 2 with leaving a slight clearance (d) between the inner peripheral surface of the sealing plate 6 and the outer shoulder 1b of the inner race 1 so as to prevent the sealing plate and the inner race from contacting with each other. Thus the labyrinth seal function can be obtained.

Figure 4:
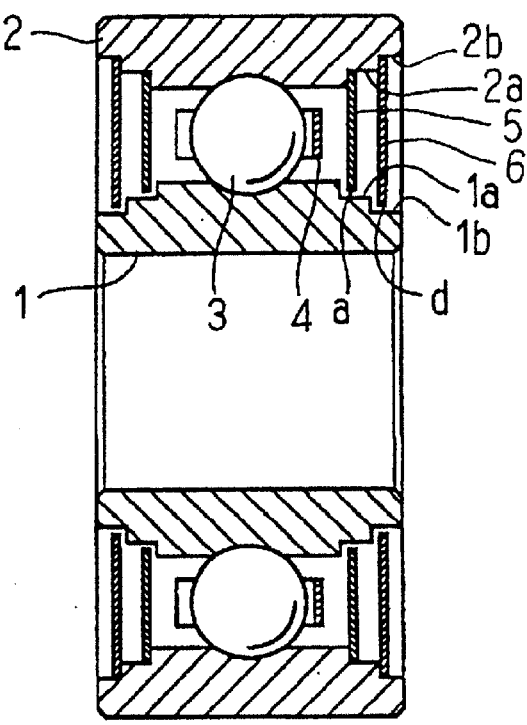
FIG. 4 is a longitudinal cross sectional view showing a double seal bearing of the third embodiment of the present invention.

In the structure of the bearing of the third embodiment of the present invention as shown in FIG. 4, the outer peripheral portion of the inner sealing plate 5 is secured by any adhesive on the inner shoulder 2a of the outer race 2 with leaving a slight clearance (a) between the inner peripheral surface of the sealing plate 5 and the inner shoulder 1a of the inner race 1 so as to prevent the sealing plate and the inner race from contacting with each other. Thus the labyrinth seal function can be obtained.

The outer peripheral portion of the outer sealing plate 6 is also secured by any adhesive on the outer shoulder 2b of the outer race 2 with leaving a slight clearance (d) between the inner peripheral surface of the sealing plate 6 and the outer shoulder 1b of the inner race 1 so as to prevent the sealing plate and the inner race from contacting with each other. Thus the labyrinth seal function can be obtained.

Figure 5:
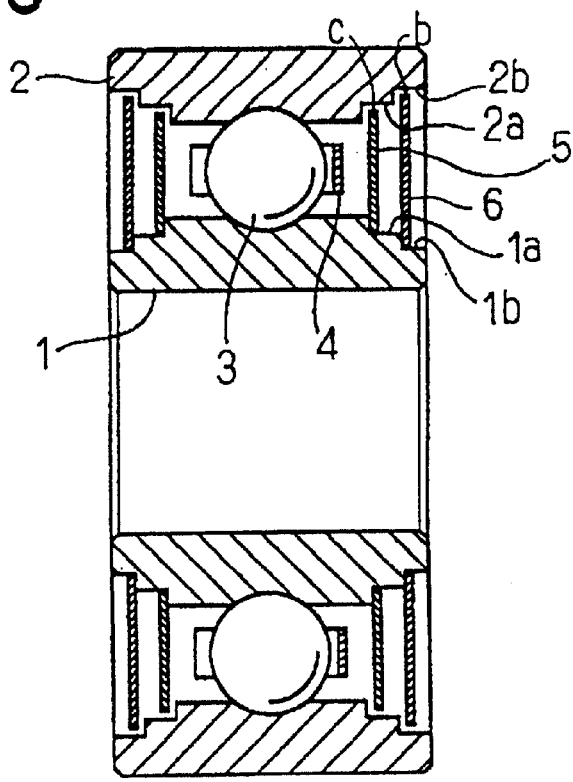
FIG. 5 is a longitudinal cross sectional view showing a double seal bearing of the fourth embodiment of the present invention.

In the structure of the bearing of the fourth embodiment of the present invention as shown in FIG. 5, the inner peripheral portion of the inner sealing plate 5 is secured by any adhesive on the inner shoulder 1a of the inner race 1 with leaving a slight clearance (c) between the outer peripheral surface of the sealing plate 5 and the inner shoulder 2a of the outer race 2 so as to prevent the sealing plate and the outer race from contacting with each other. Thus the labyrinth seal function can be obtained.

The inner peripheral portion of the outer sealing plate 6 is also secured by any adhesive on the outer shoulder 1b of the inner race 1 with leaving a slight clearance (b) between the outer peripheral surface of the sealing plate 6 and the outer shoulder 2b of the outer race 2 so as to prevent the sealing plate and the outer race from contacting with each other. Thus the labyrinth seal function can be obtained.

Figure 6:
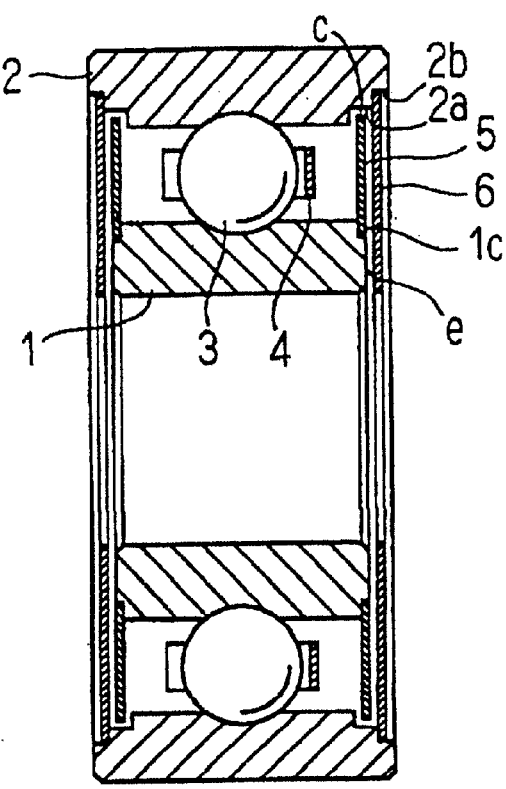
FIG. 6 is a longitudinal cross sectional view showing a double seal bearing of the fifth embodiment of the present invention.

In the structure of the bearing of the fifth embodiment of the present invention as shown in FIG. 6, the inner race and the outer sealing plate are substantially different from those of embodiments 1–4.

In other words, the inner race 1 of this embodiment includes only one shoulder 1c, and the inner peripheral portion of the inner sealing plate 5 is secured thereon by any adhesive with leaving a slight clearance (c) between the outer peripheral surface of the sealing plate 5 and the inner shoulder 2a of the outer race 2 so as to prevent the sealing plate and the outer race from contacting with each other. Thus the labyrinth seal function can be obtained.

The diameter of the inner peripheral portion of the outer sealing plate 6 is same as or larger than the diameter of the shaft bearing bore of the inner race. The outer peripheral portion of the outer sealing plate 6 is secured by any adhesive on the outer shoulder 2b with leaving a slight axial clearance (e) between the end surface of the inner race 1 and the surface of the outer sealing plate 6 opposing thereto so as to prevent the sealing plate and the inner race from contacting with each other. Thus the labyrinth seal function can be obtained.

Figure 7:
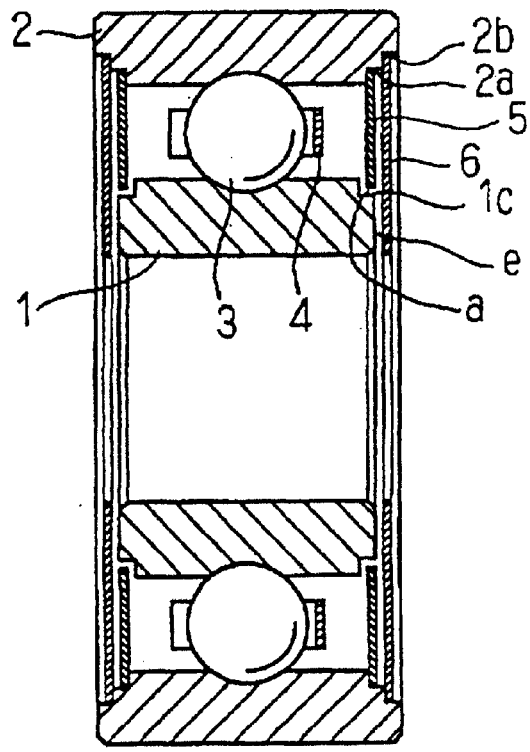
FIG. 7 is a longitudinal cross sectional view showing a double seal bearing of the sixth embodiment of the present invention.

In the structure of the bearing of the sixth embodiment of the present invention as shown in FIG. 7, the outer peripheral portion of the inner sealing plate 5 is secured by any adhesive on the inner shoulder 2a of the outer race 2 with leaving a slight clearance (a) between the inner peripheral surface of the sealing plate 5 and the shoulder 1c of the inner race so as to prevent the sealing plate and the inner race from contacting with each other. Thus the labyrinth seal function can be obtained therebetween.

The diameter of the inner peripheral portion of the outer sealing plate 6 is same as or larger than the diameter of the shaft bearing bore of the inner race 1. The outer peripheral portion of the outer sealing plate 6 is secured by any adhesive on the outer shoulder 2b with leaving a slight axial clearance (e) between the end surface of the inner race 1 and the surface of the outer sealing plate 6 opposing thereto so as to prevent the sealing plate and the inner race from contacting with each other. Thus the labyrinth seal function can be obtained.

Figure 8:
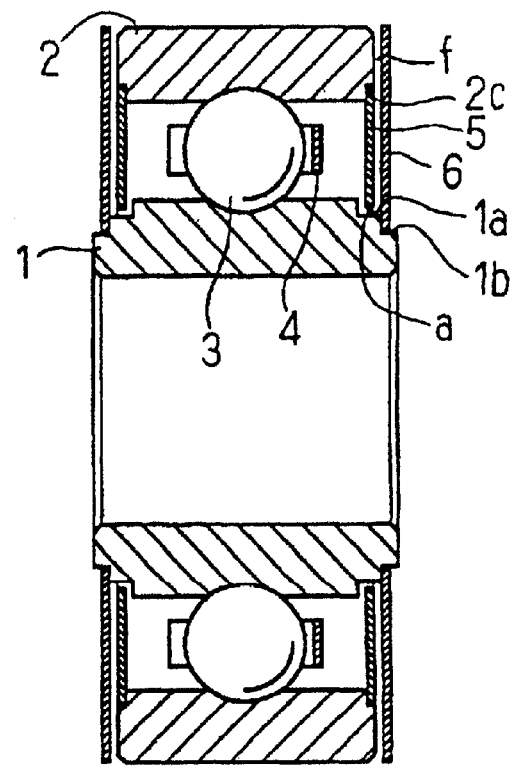
FIG. 8 is a longitudinal cross sectional view showing a double seal bearing of the seventh embodiment of the present invention.

In the structure of the bearing of the seventh embodiment of the present invention as shown in FIG. 8, the outer race 2 includes only one shoulder 2c, and the outer peripheral portion of the inner sealing plate 5 is secured thereon by any adhesive with leaving a slight clearance (a) between the inner peripheral surface of the sealing plate 5 and the inner shoulder 1a of the inner race 1 so as to prevent the sealing plate and the inner race from contacting with each other. Thus the labyrinth seal function can be obtained.

The diameter of the outer peripheral portion of the outer sealing plate 6 is same as or smaller than the outer diameter of the outer race. The inner peripheral portion of the outer sealing plate 6 is secured by any adhesive on the outer shoulder 1b with leaving a slight axial clearance (f) between the end surface of the outer race 1 and the surface of the outer sealing plate 6 opposing thereto so as to prevent the sealing plate and the inner race from contacting with each other. Thus the labyrinth seal function can be obtained.

Figure 9:
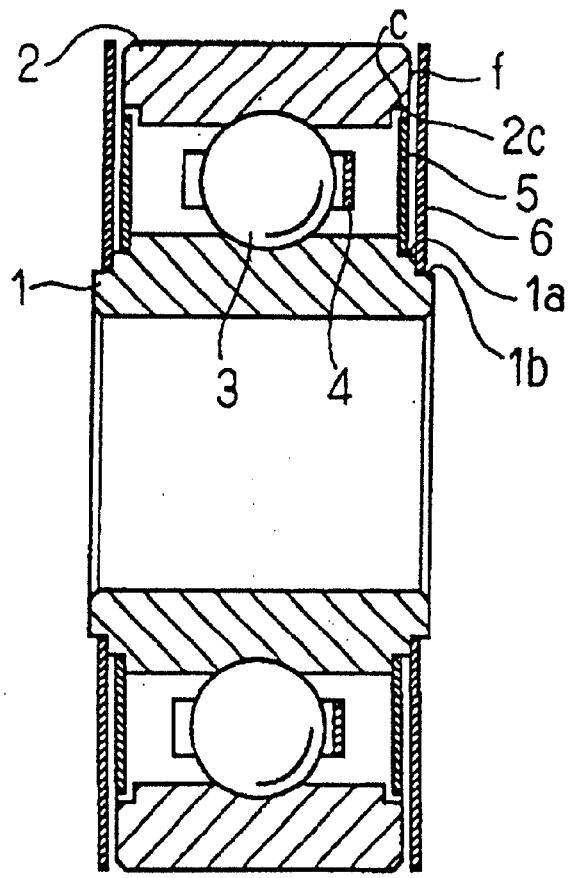
FIG. 9 is a longitudinal cross sectional view showing a double seal bearing of the eighth embodiment of the present invention.

In the structure of the bearing of the eighth embodiment of the present invention as shown in FIG. 9, the outer race 2 includes only one shoulder 2c, and the outer diameter of the outer sealing plate 6 is same as or slightly smaller than that of outer race. The inner peripheral portion of the inner sealing plate 5 is secured on the inner shoulder 1a of inner race 1 by any adhesive with leaving a slight clearance (c) between the outer peripheral surface of the sealing plate 5 and the shoulder 2c of the outer race 2 so as to prevent the sealing plate and the outer race from contacting with each other. Thus the labyrinth seal function can be obtained.

The inner peripheral portion of the outer sealing plate 6 is secured by any adhesive on the outer shoulder 2 of outer race 2 with leaving a slight axial clearance (f) between the end surface of the outer race and the surface of the outer sealing plate 6 opposite thereto so as to prevent the sealing plate and the outer race from contacting with each other. Thus the labyrinth seal function can be obtained.

In the above mentioned embodiments, although a pair of inner and outer sealing plates 5 and 6 are adapted to be provided on both sides of the bearing body, these sealing plates can be provided on one side of the bearing body. In such a case, the opposite side of the bearing body can be provided with a sheet of sealing plate of contacting or non-contacting type, or no plates are provided.

In the illustrated embodiment, although rotating bodies are shown as balls of the boll bearing, rollers (in the case of roller bearing) can also be utilized. Further, the present invention can be applied equally to the needle bearing and the fluid journal bearing.

The bearing in accordance with the present invention can be applied to many kind of motors. In particular, the bearing of the present invention can be employed as a bearing of the motor of the hard disk drive means, or a bearing of the pivot shaft of the swing arm of the hard disk drive means.

While particular embodiments of the present invention have been illustrated and described, it should be obvious to those skilled in the art that various changes and modifications can be made without departing from the spirit and scope of the invention.

What is claimed is:

1. A double seal bearing including an inner race, an outer race, and rotating bodies interposed therebetween, wherein:

at least at one end of the outer race a shoulder is provided on an inner peripheral surface of said outer race, and at least at one end of the inner race there are provided on an outer peripheral surface of the inner race an inner shoulder of larger diameter and an outer shoulder of smaller diameter, further including a pair of annular inner and outer sealing plates each having a respective central opening, said inner sealing plate being secured on one of the inner or outer races while leaving a clearance between the inner sealing plate and the other of the inner or outer races so as to prevent the inner sealing plate and the other of the inner or outer races from contacting each other to assure the labyrinth seal function, an outer diameter of the outer sealing plate being substantially the same as or smaller than an outer diameter of the outer race, an inner peripheral portion of the outer sealing plate being secured on an end surface of the outer shoulder of the inner race while leaving an axial clearance between an outer peripheral portion of the outer sealing plate and an end surface of the outer race so as to prevent the outer sealing plate and the outer race from contacting each other to assure the labyrinth seal function.

2. A double seal bearing according to claim 1 wherein an outer peripheral portion of the inner sealing plate is secured on the shoulder of the outer race while leaving a clearance between an inner peripheral portion of the inner sealing plate and the inner shoulder of the inner race so as to prevent the inner sealing plate and the inner race from contacting each other to assure the labyrinth seal function.

3. A double seal bearing according to claim 1 wherein an inner peripheral portion of the inner sealing plate is secured on the inner shoulder of the inner race while leaving a clearance between an outer peripheral portion of the inner sealing plate and the shoulder of the outer race so as to prevent the inner sealing plate and the outer race from contacting each other to assure the labyrinth seal function.

4. A double seal bearing including an inner race, an outer race, and rotating bodies interposed therebetween, wherein:
   the outer race includes a shoulder at each end thereof, each said shoulder provided on an inner peripheral surface of said outer race, and
   the inner race includes at each end thereof an inner shoulder of larger diameter and an outer shoulder of smaller diameter, an outer peripheral surface of the inner race having a stepped contour at each end thereof formed by respective ones of said inner and outer shoulders;
   further including a pair of annular inner and outer sealing plates each having a respective central opening,
   said inner sealing plate being secured on one of the inner or outer races while leaving a clearance between the inner sealing plate and the other of the inner or outer races so as to prevent the inner sealing plate and the other of the inner or outer races from contacting each other to assure the labyrinth seal function,
   an outer diameter of the outer sealing plate being substantially the same as or smaller than an outer diameter of the outer race,
   an inner peripheral portion of the outer sealing plate being secured on an end surface of the outer shoulder of the inner race while leaving an axial clearance between an outer peripheral portion of the outer sealing plate and an end surface of the outer race so as to prevent the outer sealing plate and the outer race from contacting each other to assure the labyrinth seal function.

5. A double seal bearing according to claim 4, wherein said bearing includes a pair of annular inner sealing plates and a pair of outer sealing plates, each sealing plate having a respective central opening,
   each said inner sealing plate being respectively secured to a respective one of the inner or outer races at a respective end thereof, while leaving a clearance between the respective inner sealing plate and the other of the inner or outer races at said respective end so as to prevent the respective inner sealing plate and the other of the inner or outer races from contacting each other,
   an outer diameter of each said outer sealing plate being substantially the same as or smaller than an outer diameter of the outer race,
   an inner peripheral portion of each respective outer sealing plate being respectively secured to a respective outer shoulder of the inner race at a respective end of the inner race while leaving an axial clearance between an outer peripheral portion of the respective outer sealing plate and a corresponding end surface of the outer race so as to prevent the respective outer sealing plate and outer race from contacting each other.

6. A double seal bearing according to claim 5 wherein an outer peripheral portion of one of said inner sealing plates is secured to the shoulder of said outer race at one end of said bearing while leaving a clearance between an inner peripheral portion of said one of said inner sealing plates and the inner shoulder of the inner race at said one end so as to prevent the inner sealing plate and the inner race from contacting each other at said one end to assure the labyrinth seal function.

7. A double seal bearing according to claim 6 wherein an inner peripheral portion of the other of said inner sealing plates is secured to the inner shoulder of said inner race at the other end of said bearing while leaving a clearance between an outer peripheral portion of said other of the inner sealing plate and the shoulder of the outer race at said other end so as to prevent the other inner sealing plate and the outer race from contacting each other to assure the labyrinth seal function.

\* \* \* \* \*